United States Patent
Hagiwara et al.

(10) Patent No.: US 6,772,615 B2
(45) Date of Patent: Aug. 10, 2004

(54) METHOD OF MANUFACTURING HUB UNIT FOR SUPPORTING WHEEL AND DIE FOR MANUFACTURING THE SAME

(75) Inventors: Nobuyuki Hagiwara, Kanagawa (JP); Shoji Horike, Kanagawa (JP)

(73) Assignee: NSK Ltd., Tokyo (JP)

( * ) Notice: Subject to any disclaimer, the term of this patent is extended or adjusted under 35 U.S.C. 154(b) by 31 days.

(21) Appl. No.: 10/153,788

(22) Filed: May 24, 2002

(65) Prior Publication Data

US 2003/0061713 A1 Apr. 3, 2003

(30) Foreign Application Priority Data

Sep. 20, 2001 (JP) .................................. P.2001-286858

(51) Int. Cl.$^7$ ................................................ B21B 1/00
(52) U.S. Cl. ............................... 72/67; 72/112; 72/115; 29/894.362; 29/898.07
(58) Field of Search ....................... 72/67, 74, 112, 72/115, 343, 462, 476; 29/898.062, 898.07, 894.361, 894.362; 301/105.1; 384/537, 544

(56) References Cited

U.S. PATENT DOCUMENTS

| 5,490,732 | A | | 2/1996 | Hofmann et al. |
| 6,113,279 | A | | 9/2000 | Sawai et al. |
| 6,553,666 | B2 | * | 4/2003 | Miyazaki ............... 29/894.362 |
| 6,619,852 | B2 | * | 9/2003 | Toda et al. .................. 384/537 |
| 6,672,769 | B2 | * | 1/2004 | Toda et al. .................. 384/544 |
| 6,682,225 | B2 | * | 1/2004 | Sahashi et al. ............. 384/544 |

FOREIGN PATENT DOCUMENTS

| EP | 0 854 303 A2 | 7/1998 |
| EP | 0 992 698 A2 | 4/2000 |
| EP | 1 079 125 A2 | 2/2001 |
| JP | 10-272903 | 10/1998 |

* cited by examiner

*Primary Examiner*—Ed Tolan
(74) *Attorney, Agent, or Firm*—Sughrue Mion, PLLC

(57) ABSTRACT

When a shape of the cylindrical portion (8b) to be formed into the calking portion (9b) is devised and when a sectional shape of the annular recess portion (23) of the die (15a) for plastically deforming the cylindrical portion (8b) is devised, the calking portion (9b) is continuously given a compressive average stress during the process of working.

11 Claims, 12 Drawing Sheets

PRIOR ART

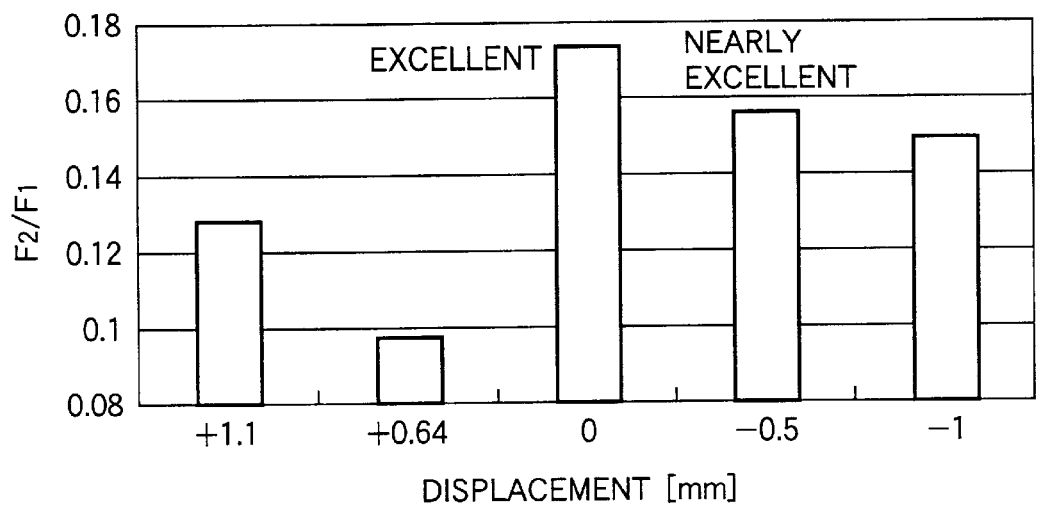
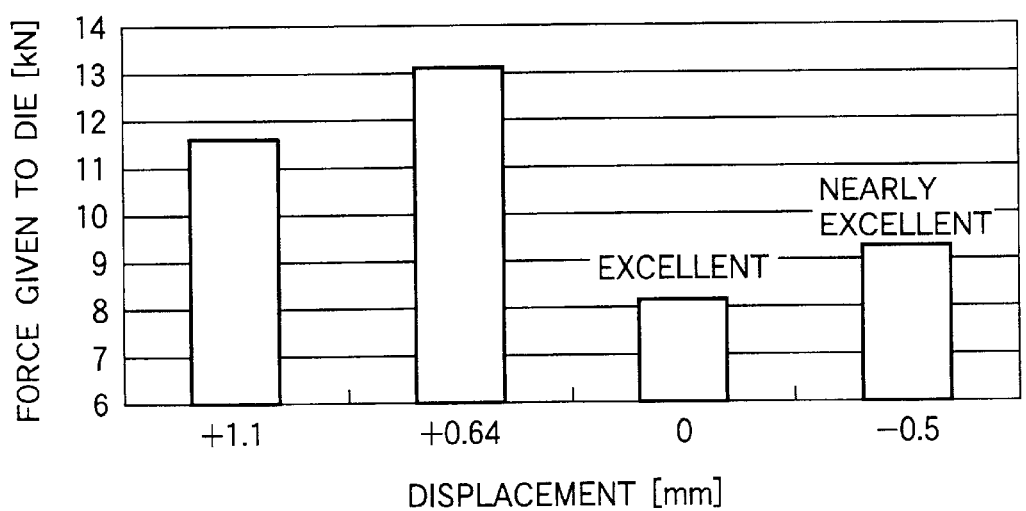

PRIOR ART

METHOD OF MANUFACTURING HUB UNIT FOR SUPPORTING WHEEL AND DIE FOR MANUFACTURING THE SAME

BACKGROUND OF THE INVENTION

1. Field of the Invention

A method of manufacturing a hub unit for supporting a wheel and a die for manufacturing it of the present invention are utilized for manufacturing a hub unit for pivotally supporting a wheel of an automobile by a suspension.

2. Description of the Related Art

A wheel of an automobile is supported by a suspension via a hub unit for supporting the wheel. FIG. 10 is a view showing an example of the hub unit for supporting a wheel described in the U.S. Pat. No. 5,490,732. This hub unit 1 for supporting a wheel includes: a hub body 2, a pair of inner rings 3a, 3b, an outer ring 4, and a plurality of rolling elements 5, 5. In this arrangement, in the outside end portion of the outer circumferential face of the hub body 2, there is provided a flange 6 for supporting a wheel. In this case, the outside of the hub body is defined as a side which becomes an outside in the width direction when the hub is assembled to an automobile, that is, the outside of the hub body is the left in FIG. 10. On the contrary, the inside of the hub body is defined as a side which becomes a portion close to the center of an automobile, that is, the inside of the hub is the right in FIG. 10. At a base end portion of the flange 6 close to the center of the hub body 2, there is provided a step portion 7.

The pair of inner rings 3a, 3b, are externally engaged with a portion located in a range from the middle portion to the inside end portion of the hub body 2. An outside end face of the inner ring 3a, which is arranged outside, butts to a step face of the step portion 7, and an outside end face of the inner ring 3b, which is arranged inside, butts to an inner end face of the inner ring 3a which is arranged outside. In this connection, when a view is taken from the inner ring 3b which is located inside, the inside end face of the inner ring 3a, which is located outside, becomes a step face of the step portion. In the inside end portion of the hub body 2, there is provided a cylindrical portion 8. A forward half portion of this cylindrical portion 8, which protrudes inside from the inside end face of the inner ring 3b, is plastically deformed in the radial outward direction so that the calking portion 9 can be formed. The pair of inner rings 3a, 3b are interposed between the calking portion 9 and the step face of the step portion 7.

Between the pair of outer ring raceways 10, 10 (the first and the second raceways) provided on the inner circumferential face of the outer ring 4 and the inner ring raceways 11, 11 (the first and the second inner ring raceways) provided on the outer circumferential faces of the inner rings 3a, 3b, a plurality of rolling elements 5, 5 are respectively arranged. In this connection, in the example shown in the drawing, balls are used as the rolling elements 5, 5, however, in the case of a hub unit for supporting a wheel used for an automobile, the weight of which is heavy, tapered rollers may be used for the rolling elements. In some cases, the inner ring raceway 11 (the first inner ring raceway) arranged close to the flange 6 may be directly formed on an outer circumferential face of the hub body 2 so as to omit the inner ring 3a which is located outside. In this case, the step portion 7 is formed at a position corresponding to the inside of the outside inner ring 3a shown in FIG. 10.

In order to assemble the hub unit 1 for supporting a wheel into an automobile, the outer ring 4 is fixed to the suspension by the attaching portion 12, the shape of which is formed into an outward flange-shape, which is formed on an outer circumferential face of the outer ring 4, and a wheel is fixed to the flange 6. As a result, the wheel can be pivotally supported by the suspension.

Further, Japanese Unexamined Patent Publication No. 10-272903 discloses a structure in which damage such as cracks seldom occurs in the calking portion when the inner ring is fixed and the inner diameter of the inner ring and the diameter of the inner ring raceway formed on the outer circumferential face of the inner ring are difficult to be changed when calking work is carried out. FIGS. 11 to 15 are views showing the second example of the conventional structure disclosed in the above patent publication and also showing a conventional manufacturing method.

As shown in FIG. 14, before the cylindrical portion 8a is calked and expanded in the radial outward direction, the wall thickness of the cylindrical portion 8a, which is formed in the inside end portion of the hub body 2 so that the calking portion 9a for fixing the inner ring 3 can be composed, is gradually reduced when it comes to the forward end edge. Therefore, on the inside end face of the hub body 2, there is provided a tapered hole 13, the inner diameter of which is gradually reduced when it comes to the inner portion.

In order to calk and expand the forward end portion of the cylindrical portion 8a so that the inner ring 3 can be fixed to the inside end portion of the hub body 2, the hub body 2 is fixed so that it can not be moved in the axial direction, and the holding piece 14 holds the outer circumferential face of the inner ring 3 as shown in FIG. 15. While the hub body 2, on the outer circumferential face of which the inner ring 3 is engaged, is being prevented from fluctuating in the radial direction, as shown in the drawing, the die 15 is strongly pressed against the forward end portion of the cylindrical portion 8a. A central portion of the forward end face (lower end face shown in FIG. 15) of the die 15 is formed into a protruding portion 16, the shape of which is a circular truncated cone, which can be freely pushed into the cylindrical portion 8a. In the periphery of this protruding portion 16, there is provided a recess portion 17, the section of which is an arc, which surrounds the overall circumference of the protruding portion 16.

On the other hand, in the periphery of the inside end opening of the inner ring 3 to be fixed to the inner end portion (the right end portion shown in FIG. 11, the upper end portions shown in FIGS. 12 to 15) of the hub body 2 by the calking portion 9a, there is provided an inside end face 18 which is a flat face perpendicular to the central axis of this inner ring 3. The inner circumferential edge of the inside end face 18 and the inner circumferential face 19 of the inner ring 3, which is a cylindrical face, are continued to each other by the chamfer portion 20.

The calking portion 9a for pressing the inner ring 3, the shape of the inside end portion of which is formed as described above, against the step portion 7 of the hub body 2 is composed when the cylindrical portion 8a is calked and expanded in the radial outward direction. The wall thickness of the calking portion 9a is gradually reduced with respect to the wall thickness $a_0$ of the base end portion of the cylindrical portion 8a (FIG. 12) when it comes to the forward end portion. That is, as shown in FIG. 13, the wall thickness of the base end portion of the calking portion 9a is $a_0$, and this wall thickness is changed in the order of $a_0$, $a_1$, $a_2$, ... $a_n$ when it comes to the forward end portion. In this case, sections of the protruding portion 16 and the recess portion 17 are regulated to form the calking portion 9a so that the wall thickness of each portion can be kept in the relation of $a_0 > a_1 > a_2 > \ldots a_n$ and so that the wall thickness $a_n$ of the forward end portion of the calking portion 9a can not become zero ($a_n > 0$).

When the die 15 having the protruding portion 16 and the recess portion 17 is incorporated into an oscillating calking device and the die 15 is pressed against the forward end portion of the cylindrical portion 8a, it is possible to calk and expand the forward end portion of the cylindrical portion 8a in the radial outward direction, so that the calking portion 9a can be formed. Therefore, the inner ring 3 can be interposed between the calking portion 9a and the step face 25 of the step portion 7 formed in the inside end portion of the hub body 2, and the inner ring 3 can be fixed to the hub body 2. In the example shown in the drawing, at the final stage of forming the calking portion 9a by plastically deforming the inside end face of the cylindrical portion 8a, a compressive force, the direction of which is in the radial inward direction, is given by the inner face of the recess portion 17 to the outer circumferential face of the calking portion 9a. Accordingly, it is possible to prevent the occurrence of damage such as cracks in the outer circumferential edge of the calking portion 9a. In the inside end opening circumferential edge portion of the inner ring 3 coming into contact with the outer circumferential face of the base end portion of the calking portion 9a, there is provided a chamfer portion 20, the section of which is an arc. Therefore, the radius of curvature of the base end portion of the calking portion 9a is not decreased. Therefore, an excessively high stress is seldom given to the base end portion.

In the conventional method of manufacturing a hub unit for supporting a wheel described in Japanese Unexamined Patent Publication No. 10-272903, it is surely possible to prevent the occurrence of cracks in the outer circumferential edge of the calking portion 9a. However, there is a possibility that cracks are caused on the forward end face or inner circumferential face of the calking portion 9a. In the conventional structure, as shown in FIG. 14, the inclination angle $\theta_{21}$ of the inner circumferential face 21 of the cylindrical portion 8a is set at a relatively large angle of 20°, so that a difference between the wall thickness of the base end portion of the cylindrical portion 8a and that of the forward end portion is made large. When this cylindrical portion 8a is plastically deformed by the die 15 which is incorporated into an oscillating calking device, an average tensile stress tends to be generated in the forward end face and the inner circumferential face of the cylindrical portion 8a and the calking portion 9a. When a value of this average tensile stress is increased, cracks are caused in the portion concerned, and the hub body becomes defective, which needs to be discarded. Therefore, the yield is deteriorated or it becomes necessary to repair the portion in which cracks have been caused. In any case, the manufacturing cost is raised.

Further, since the inclination angle $\theta_{21}$ of the inner circumferential face 21 of the cylindrical portion 8a is large, when this cylindrical portion 8a is pressed by the die 15, a force tends to be given to the base portion of this cylindrical portion 8a in the radial outward direction. When the outer diameter of the cylindrical portion 8a is expanded by this force, the inner ring 3 externally engaged with the step portion 7 existing in the periphery of the cylindrical portion 8a is elastically deformed, and a diameter of the inner ring raceway 11 formed on the outer circumferential face of the inner ring 3 is extended, which could be a cause of a change in the pre-load of the rolling bearing.

SUMMARY OF THE INVENTION

The method of manufacturing a hub unit for supporting a wheel and the die for manufacturing it of the present invention have been accomplished to prevent the occurrence of cracks in the calking portion 9a and the extension of the diameter of the inner ring 3.

In the same manner as that of the conventional hub unit for supporting a wheel, the hub unit for supporting a wheel, which is manufactured by the method of manufacturing a hub unit for supporting a wheel of the present invention, includes: a hub body, a first inner ring raceway, a step portion, an inner ring, an outer ring and a plurality of rolling elements.

In the hub body, there is provided a flange, which is formed on an outer circumferential face of one end face, for supporting a wheel.

The first inner ring raceway is formed on an outer circumferential face of a middle portion of the hub body directly or via an inner ring which is formed differently from the hub body.

The step portion is formed in the other end portion of the hub body, and the outer diameter of the step portion is smaller than that of the portion in which the first inner ring raceway is formed.

The inner ring forms a second inner ring raceway on the outer circumferential face and externally engages with the step portion.

On the inner circumferential face of the outer ring, there are provided a first outer ring raceway opposing to the first inner ring raceway and a second outer ring raceway opposing to the second inner ring raceway.

There are respectively provided a plurality of rolling elements between the first inner ring raceway and the first outer ring raceway and also between the second inner ring raceway and the second outer ring raceway.

At the other end portion of the hub body, the calking portion is composed when the cylindrical portion formed in a portion protruding more than the inner ring, which is externally engaged with the step portion, is plastically deformed in the radial outward direction. By this calking portion, the inner ring externally engaged with the step portion is pressed against the step face of the step portion, so that the inner ring externally engaged with the step portion can be connected with and fixed to the hub body.

According to the method of manufacturing a hub unit for supporting a wheel of the present invention, in order to make the above hub unit for supporting a wheel, the cylindrical portion is plastically deformed and formed into the calking portion.

According to the method of manufacturing a hub unit for supporting a wheel of the present invention according to a first aspect of the invention, while the die is being pressed against the forward end face of the cylindrical portion, the die gives forces to the cylindrical portion in the axial direction and the radial outward direction. While this cylindrical portion is being compressed in the axial direction, the forward end portion of the cylindrical portion is plastically deformed in the radial outward direction so that the calking portion can be formed. Therefore, while the calking portion is being formed, an average stress of compression (average compressive stress) is continuously generated on the inner circumferential face of the cylindrical portion.

In this connection, this average compressive stress is hydrostatic stress $\sigma_m$. This hydrostatic stress $\sigma_m$ can be expressed by $\sigma_m = (\sigma_1 + \sigma_2 + \sigma_3)/3$, wherein $\sigma_1$, $\sigma_2$ and $\sigma_3$ are longitudinal stress acting in the directions of three axes (axes of x, y and z). When the hydrostatic pressure is p, the expression $p = -\sigma_m$ can be established.

According to the method of manufacturing a hub unit for supporting a wheel according to a second aspect of the invention, while the calking portion is being formed by plastically deforming the cylindrical portion, a portion of metallic material composing the cylindrical portion is moved in the radial inward direction. Therefore, after the calking portion has been formed, an expanding portion, which expands in the radial inward direction, is formed in the inner diameter portion of the calking portion.

On the pressing face of the surface of the die which comes into contact with the cylindrical portion and plastically deforms the cylindrical portion, both of or one of the surface treatment such as ceramic coating of TiN, which enhances the abrasion resistance property, and the treatment such as shot-peening, which reduces surface roughness, is conducted. In this way, the abrasion resistance property is enhanced and the friction coefficient on this pressing face is stabilized at a relatively high value not less than 0.3.

As a die used for executing the method of manufacturing a hub unit for supporting a wheel according to the second aspect of the invention, the die includes: a protruding portion, the shape of which is a circular truncated cone, capable of being freely pushed into the cylindrical portion; and an annular recess portion formed in the periphery of the protruding portion, surrounding the overall circumference of the protruding portion. It is preferable that a shape of a section of the annular recess portion is composed of an inner diameter side arc portion existing in a portion close to the inner diameter and an outer diameter side arc portion existing in a portion close to the outer diameter, the radius of curvature of the outer diameter side arc portion is smaller than that of the inner diameter side arc portion, the inner diameter side arc portion and the outer diameter side arc portion are smoothly continued to each other directly or via a straight line portion. When the annular recess portion is pressed against the forward end face of the cylindrical portion, a center of the radius of curvature of the inner diameter side arc portion does not exist outside the center of the radius of curvature of the outer diameter side arc portion with respect to the radial direction of the cylindrical portion. In other words, with respect to the radial direction of this cylindrical portion, the center of the radius of curvature of the arc on the inner diameter side exists at the same position as the center of the radius of curvature of the arc on the outer diameter side or at a position inside in the radial direction of the center of the radius of curvature of the arc on the outer diameter side. Further, this center of the radius of curvature of the arc on the outer diameter side does not exist outside in the radial direction of the cylindrical portion of the outer circumferential face of the cylindrical portion. That is, with respect to the radial direction of the cylindrical portion, the center of the radius of curvature of the arc on the outer diameter side exists at the same position as the outer circumferential face of the cylindrical portion or inside in the radial direction of the outer circumferential face.

According to the method of manufacturing a hub unit for supporting a wheel of the present invention, a tensile average stress causing cracks is not generated in the cylindrical portion and the inner circumferential portion of the calking portion when the calking portion is machined (the first aspect). Alternatively, an intensity of the tensile average stress causing cracks is reduced even if it is generated (the second aspect). The outer diameter of the base portion of the cylindrical portion is not expanded even when the calking portion is worked. Accordingly, no tensile average stress in the circumferential direction is given to the inner ring externally engaged with the step portion.

Therefore, the durability of the calking portion and the second inner ring raceway can be enhanced, that is, it is possible to provide a hub unit for supporting a wheel, the durability of which is high.

When the calking portion is formed with the die for manufacturing the hub unit for supporting a wheel according to a third aspect, an excellent calking portion can be stably formed.

BRIEF DESCRIPTION OF THE DRAWINGS

FIG. 6 is a graph showing a result of an experiment which was made to investigate how a sectional shape of a recess portion of a die affects an intensity of a force pressing an inner ring by a calking portion;

FIG. 7 is a graph showing a result of an experiment which was made to investigate how an intensity of a force given to a die affects an intensity of a force pressing an inner ring;

DETAILED DESCRIPTION OF THE PREFERRED EMBODIMENTS

Figure 1A:
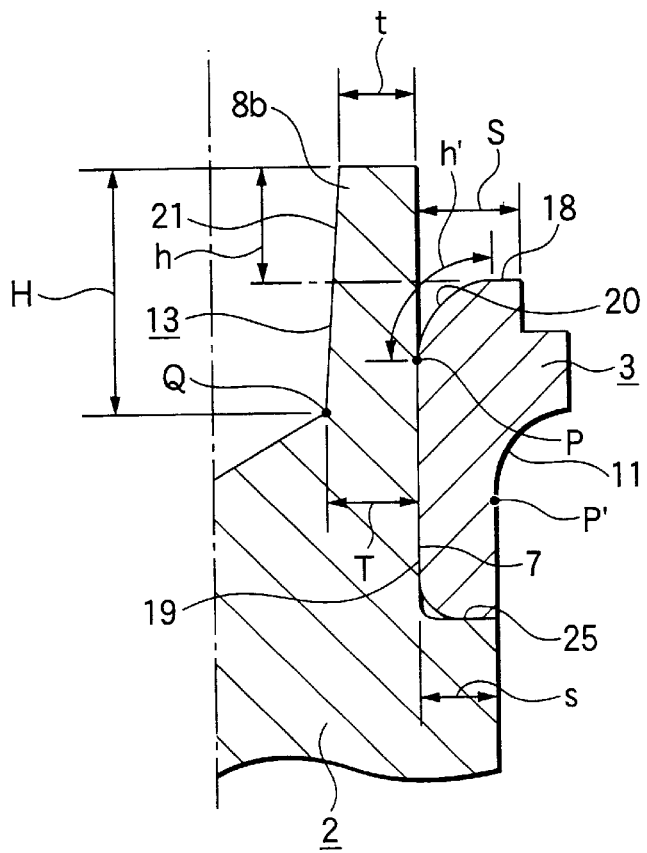
FIGS. 1A and 1B are partial sectional views showing an embodiment of the method of manufacturing a hub unit for supporting a wheel of the present invention, wherein this view shows a state before a calking portion is formed.
Figure 1B:
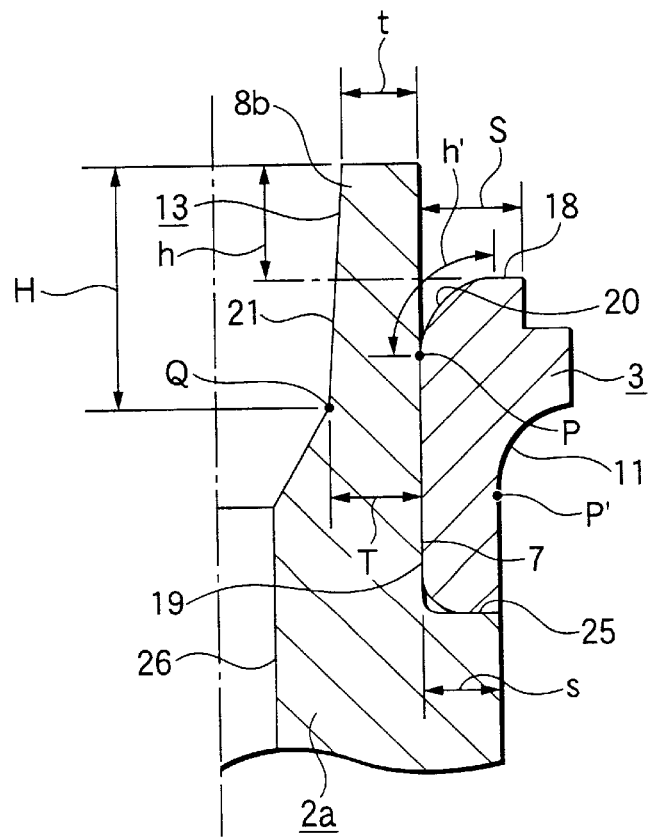
Figure 2:
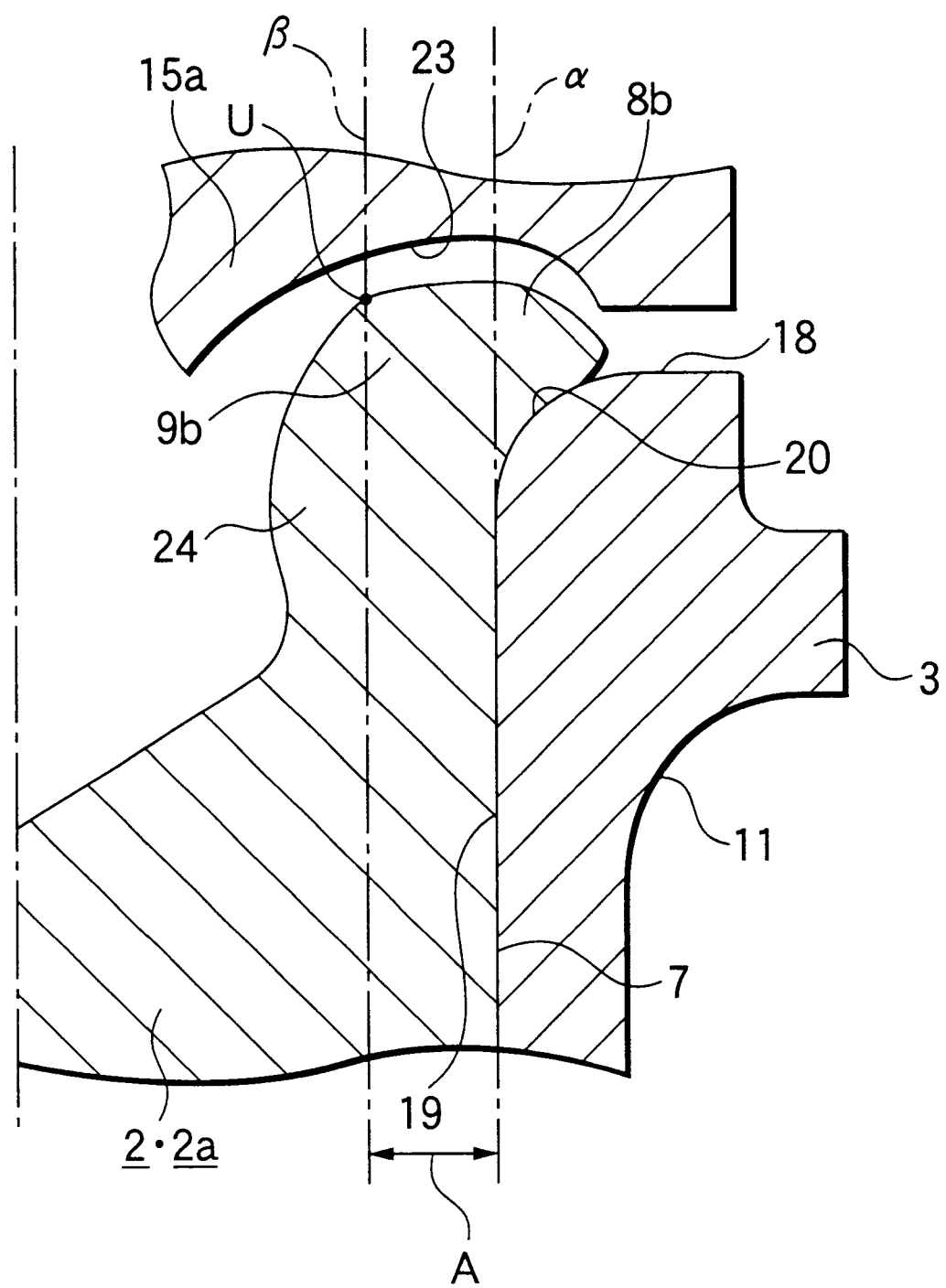
FIG. 2 is a partial sectional view showing a state after the calking portion is formed.
Figure 10:
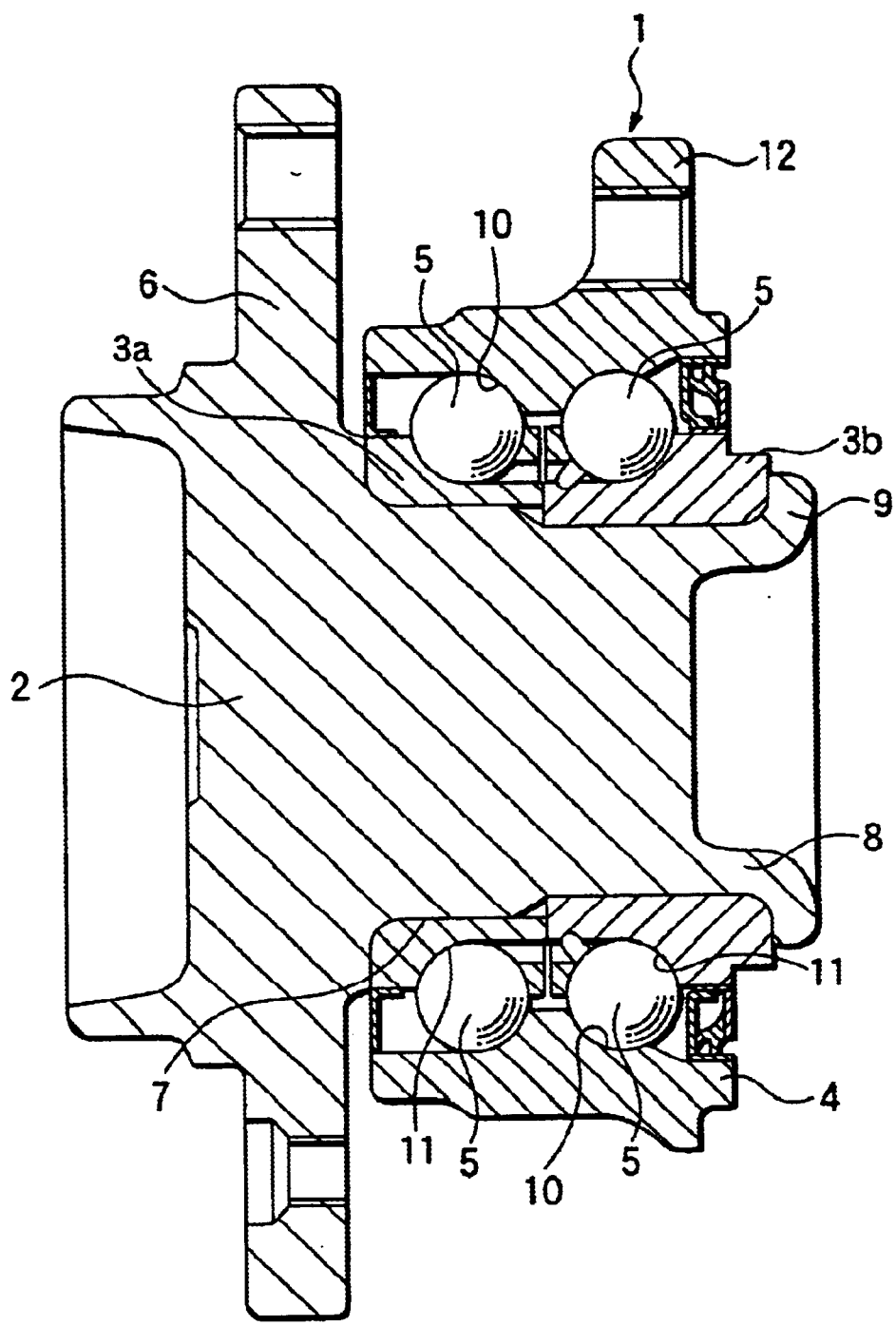
FIG. 10 is a sectional view showing the first example of the conventional structure.
Figure 11:
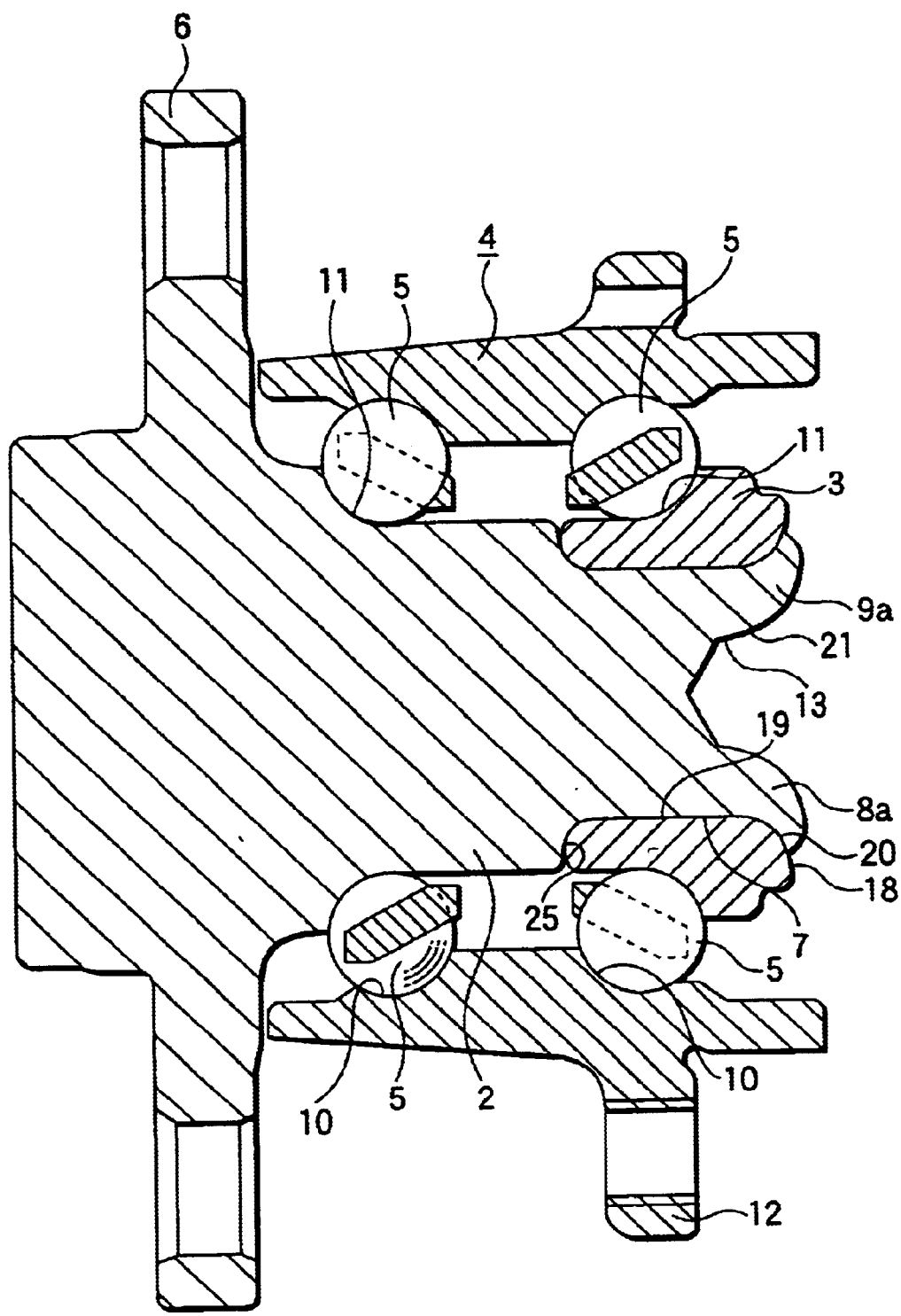
FIG. 11 is a sectional view showing the second example of the conventional structure.
Figure 12:
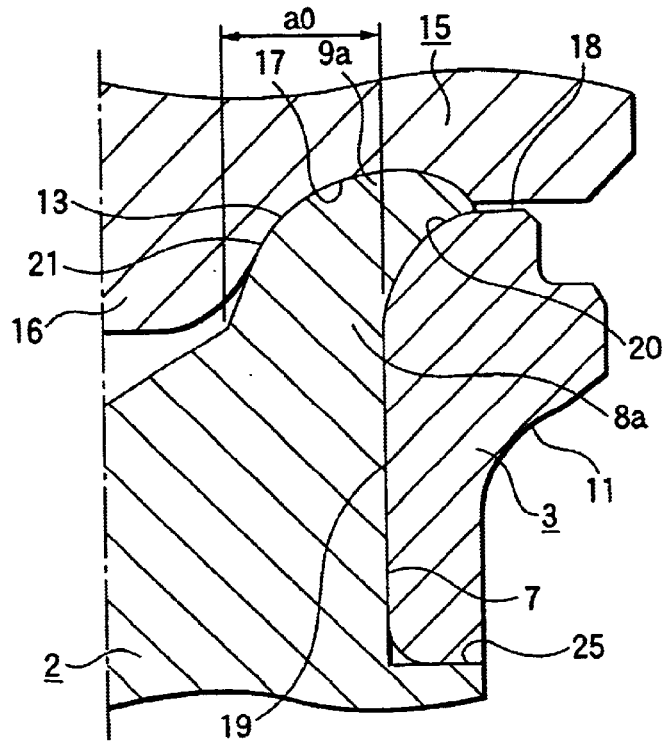
FIG. 12 is a partial sectional view showing a state in which a calking portion is formed by the conventional method.
Figure 13:
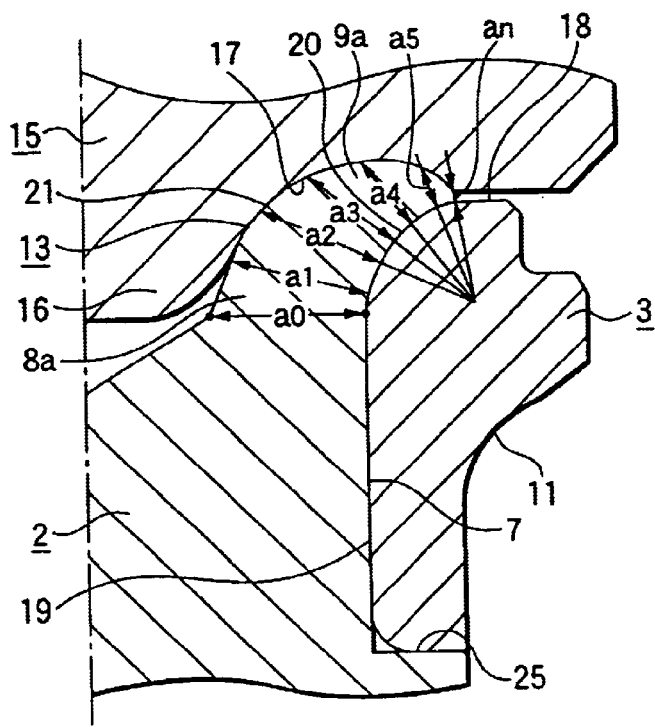
FIG. 13 is a partial sectional view for explaining a sectional shape of a calking portion formed by the conventional method.

FIGS. 1A to 2 are views showing an embodiment of the present invention. The present invention relates to improvements in the method of manufacturing a hub unit in which the calking portion 9b is formed by plastically deforming the cylindrical portion 8b formed at the inside end portion of the hub body 2, 2a so that the inner ring 3 can be fixed to the hub body 2, 2a. The essential structure of the hub unit for supporting a wheel of this embodiment is the same as that of the first example of the conventional structure shown in FIG. 10. Alternatively, the essential structure of the hub unit for supporting a wheel of this embodiment is the same as that of the second example of the conventional structure shown in FIG. 11. Therefore, illustrations and explanations of the identical portions are omitted here, and the characteristic portions of the present invention will be mainly explained here. In this connection, two types of structures are shown in FIGS. 1A and 1B. One type is shown in FIG. 1A in which the hub body 2 (the solid hub body) having no center hole, which is used for a driven wheel, is shown, and the other type is shown in FIG. 1B in which the hub body 2a having the spline hole 26, which is used for a driving wheel, is shown.

A cylindrical portion 8b is provided at the inside end portion of the hub body 2, 2a. Sizes of the cylindrical portion 8b are described as follows. The wall thickness of the base end portion in the radial direction is T, the wall thickness of the forward end portion in the radial direction is t, the distance of protrusion from the inside end face 18 of in the axial direction of the inner ring 3 is h (h is 5 to 11 mm in the case of a hub unit for supporting a wheel of a common passenger car), and the length in the axial direction is H (H is 7 to 17 mm in the case of a hub unit for supporting a wheel of a common passenger car). Sizes T, t, H and h are restricted by the size of each portion of the inner ring 3 as follows. In this connection, the protrusion h is a length in the case where the inner circumferential face of the inner ring 3 is externally engaged with the cylindrical portion 8b and the outside end face of the inner ring 3 butts to the step face 25 of the step portion 7.

First, the wall thickness T of the base end portion is 60 to 100% of the wall thickness S (S is about 5 to 9 mm in the case of a hub unit for supporting a wheel of a common passenger car.) with respect to the radial direction of the inside end portion of the inner ring 3 which is pressed by the calking portion 9b. That is, $T=(0.6 \text{ to } 1) \times S$. The reason why the wall thickness T of the base end portion is restricted as described above is that an intensity of a force given to the inner ring 3 in the case of forming the calking portion 9b is suppressed and also an intensity of a force to hold the inner ring 3 is ensured. In the case where the wall thickness T of the base end portion is smaller than 60% of the wall thickness S of the inside end portion of the inner ring 3 (T<0.6S), it is difficult for the calking portion 9b to ensure an intensity of the force to hold the inner ring 3, that is, there is a possibility that the mechanical strength of fixing the inner ring 3 becomes insufficient. On the contrary, when the wall thickness T of the base end portion exceeds the wall thickness S of the inside end portion of the inner ring 3 (T>S), in the case of forming the calking portion 9b by plastically deforming the cylindrical portion 8b, of a force given by the die 15a to the cylindrical portion 8b, so that an excessively high intensity of a force is given in the radial outward direction compared to a force given in the axial direction. As a result, a tensile average stress is generated on the inner circumferential face of the cylindrical portion 8b and on the forward end face of the calking portion 9b. Accordingly, there is a possibility that cracks are caused in the portion concerned. In this connection, in the case where the wall thickness s of the outside end portion of the inner ring 3 (s is 2 to 8 mm in the case of a hub unit for supporting a wheel of a common passenger car.) is larger than the wall thickness S of the inside end portion of the inner ring 3 (s>S), the wall thickness T of the base end portion of the cylindrical portion 8b is set at 60 to 100% of the wall thickness s of the outside end portion of the inner ring 3 {$T=(0.6 \text{ to } 1) \times s$}. However, in the case where the wall thickness s of this outside end portion is smaller than 4 mm, the calculation is conducted while the wall thickness s is set at 4 mm (In the case of s<4 mm, T 2.4 to 4 mm.).

Figure 14:
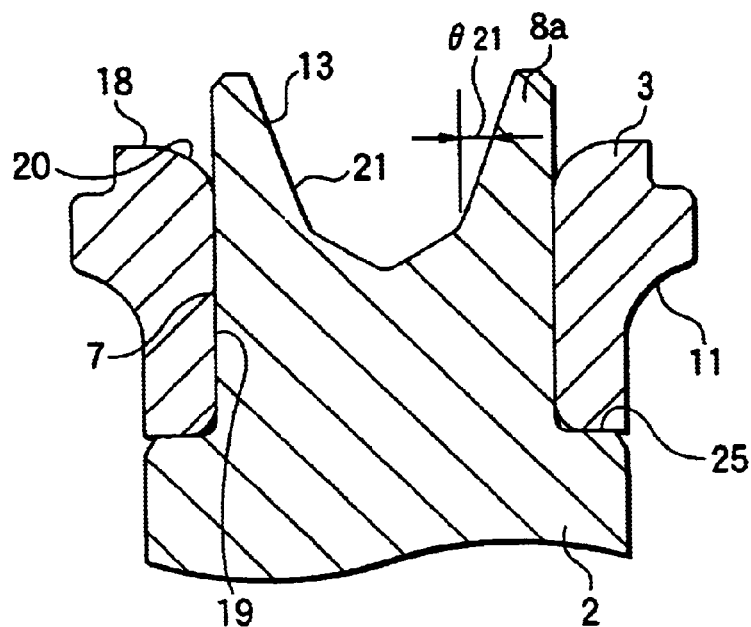
FIG. 14 is a partial sectional view for explaining a state before a calking portion is formed by the conventional method; and, FIG. 15 is a partial sectional view for explaining a state in which a calking portion is formed by the conventional method.
Figure 15:
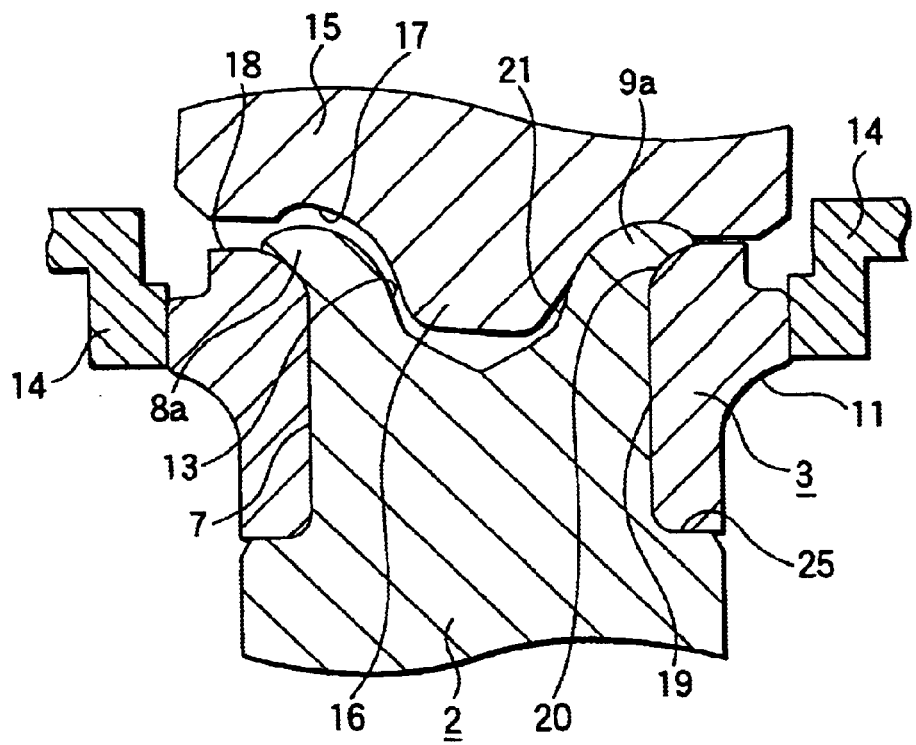

Next, the wall thickness t of the forward end portion of the cylindrical portion 8b is determined as follows. The wall thickness t of the forward end portion of the cylindrical portion 8b is 70 to 100% {$t=(0.7 \text{ to } 1.0) \times T$} of the wall thickness T of the base end portion. It is preferable that the wall thickness t of the forward end portion of the cylindrical portion 8b is 70 to 95% {$t=(0.7 \text{ to } 0.95) \times T$} of the wall thickness T of the base end portion. The reason why the wall thickness t of the forward end portion of the cylindrical portion 8b is determined as described above is that the cylindrical portion 8b is formed into the calking portion without causing any problem and that an average compressive stress (hydrostatic pressure>0) is generated on the inner circumferential face of the cylindrical portion 8b in the process of this calking work. According to the above conventional method shown in FIG. 14, when the wall thickness t of the forward end portion is smaller than 70% of the wall thickness T of the base end portion (t<0.7T), a tensile average stress (hydrostatic pressure<0) tends to be generated on the inner circumferential face or the inside end face portion of the cylindrical portion 8a or the calking portion 9a (shown in FIG. 15) when the calking work proceeds. Therefore, cracks tend to be caused in the portion concerned. On the other hand, when the wall thickness t of the forward end portion exceeds the wall thickness T of the base end portion by 100% (t>1.0T), a volume of the forward end portion of the cylindrical portion 8b is increased, and it becomes complicated to form the cylindrical portion 8b into the calking portion 9b. Further, the working of the cylindrical portion 8b becomes complicated. In this connection, when the wall thickness t of the forward end portion is set at a value not more than 95% of the wall thickness T of the base end portion, the above working can be conducted more easily.

The protrusion h of the cylindrical portion 8b in the axial direction from the inside end face 18 of the inner ring 3 is appropriately regulated according to the size of the calking portion 9b to be formed. When consideration is given to the fact that the cylindrical portion 8b is compressed in the axial direction and formed into the calking portion 9b while the cylindrical portion 8b is being expanded in the radial inward direction, it is appropriate that the protrusion h is made to be approximately identical with the length $h'(h \approx h')$ of the section of the chamfer portion 20, the section of which is an arc. In this case, the length h' of the section of the chamfer portion 20 is 4 to 10 mm in the case of a hub unit for supporting a wheel of a common passenger car. However, the above relation ($h \approx h'$) is not necessarily established in the case where the shape and size of the chamfer portion 20 are changed. When the protrusion h is regulated as described above, it becomes possible to positively hold the inside end face of the inner ring 3, and further it becomes unnecessary to conduct a redundant work. In the case of the size and shape shown in the drawing, when the protrusion h is much smaller than the length h' of the section (h<<h'), the calking portion 9b can not strongly hold the inner ring 3. On the other hand, when the protrusion h is much larger than the length h' of the section (h>>h'), the working of the calking portion 9b becomes complicated.

The length H of the cylindrical portion 8b in the axial direction is regulated so that the position Q in the axial direction of the base end portion of the cylindrical portion 8b can be located between the position P in the axial direction, which is at the boundary of the cylindrical portion on the inner circumferential face of the inner ring 3 and the chamfer portion 20, and the position P' in the axial direction which is at the outer end edge of the inner ring raceway 11. When the position Q of the base end portion in the axial direction is located inside (upside in FIGS. 1A and 1B) with respect to the position P of the boundary in the axial direction, the length of the cylindrical portion 8b becomes too short, and it becomes difficult to ensure quality of the calking portion 9b. Further, there is a possibility that an intensity of a force given to the position Q of the base end portion in the radial outward direction becomes relatively high. However, depending upon a case, the position Q of the base end portion in the axial direction can be moved to the inside end face 18 of the inner ring 3. On the other hand, when the position Q of the base end portion in the axial direction is located outside (downward in FIGS. 1A and 1B) with respect to the position P' of the outer end edge of the inner ring raceway 11 in the axial direction, the length of the cylindrical portion 8b becomes too long, and it becomes difficult to ensure the rigidity of the hub body 2, 2a. Further, there is a possibility that the cylindrical portion 8b is buckled in the process of calking and the chamfer portion 20 of the inner ring 3 can not be closely contacted with the calking portion 9b so that gap is caused in the portion concerned.

The cylindrical portion 8b, the size and shape of which are described above, is plastically deformed by the die 15a, which is assembled to an oscillating calking device, the section of which is shown in FIG. 2. Due to the plastic deformation, the cylindrical portion 8b is formed into the calking portion 9b shown in FIG. 2. This die 15a is provided with the annular recess portion 23. When the cylindrical portion 8b is pressed by this annular recess portion 23, the cylindrical portion 8b is plastically deformed and formed into the calking portion 9b. The sectional shape of this annular recess portion 23 will be explained below when the die 15a is put in the neutral state. In this case, the neutral state is defined as a state in which the central axis of this die 15a and the central axis of the cylindrical portion 8b or the calking portion 9b are made to coincide with each other. The radius of curvature of the section of the annular recess portion 23 is gradually changed in the radial direction. A tendency of the change in the radius of curvature is described as follows. The tendency of the change in the radius of curvature in a right portion with respect to the range A shown in FIG. 2 and the tendency of the change in the radius of curvature in a left portion with respect to the range A shown in FIG. 2 are reverse to each other. In this case, the range A is defined as a range formed between the production α of the engaging face, which is formed between the outer circumferential face of the step portion 7 and the inner circumferential face 19 of the inner ring 3, and the straight line β which passes through the point U at the inside end in the radial direction at which the die 15a and the calking portion 9b come into contact with each other and is parallel with the production α. A boundary position (boundary point) existing in this range A is appropriately determined while consideration is given to a balance of stress. A portion such as a plane, the section of which is a straight line, may be provided in the above range A, and the radius of curvature may be changed while both ends of this portion in the radial direction are used as a boundary.

First of all, in a portion on the outer diameter side of the above boundary point, the radius of curvature is relatively suddenly decreased when it comes to the outside in the radial direction. The reason is that compressive stress is generated in the forward end portions of the cylindrical portion 8b and the calking portion 9b so as to prevent the occurrence of damage such as cracks in the forward end portions.

On the other hand, in a portion on the inner diameter side with respect to the boundary point, the radius of curvature is relatively gently decreased when it comes to the inside in the radial direction. The reason is that too much metallic material of the cylindrical portion 8b is prevented from moving to the inner diameter side in the process of calking, so that the metallic material can be collected in a portion close to the boundary point and the calking portion 9b, the mechanical strength of which is high, can be obtained.

When the cylindrical portion 8b, the sectional shape of which is described above, is plastically deformed by the die 15a having the annular recess portion 23, the sectional shape of which is described above, a portion of the metallic material composing the cylindrical portion 8b is moved inside in the radial direction. Therefore, after the calking portion 9b has been formed, the expanding portion 24, which expands inward in the radial direction, is formed in the inner diameter portion of the calking portion 9b. Wall thickness of the sectional shape of the calking portion 9b obtained by the method of the present invention with respect to a virtual plane containing the central axis is gradually increased in a range from the base end portion (the lower end portion in FIG. 2) to the middle portion in the axial direction, and wall thickness is gradually decreased in a range from the middle portion to the forward end portion (the upper end portion in FIG. 2). At a bent portion located at the forward end portion, wall thickness is suddenly decreased when it comes to the outside in the radial direction. In this connection, wall thickness in the middle portion is increased as compared with the initial wall thickness of the portion concerned of the cylindrical portion 8b.

Figure 3C:
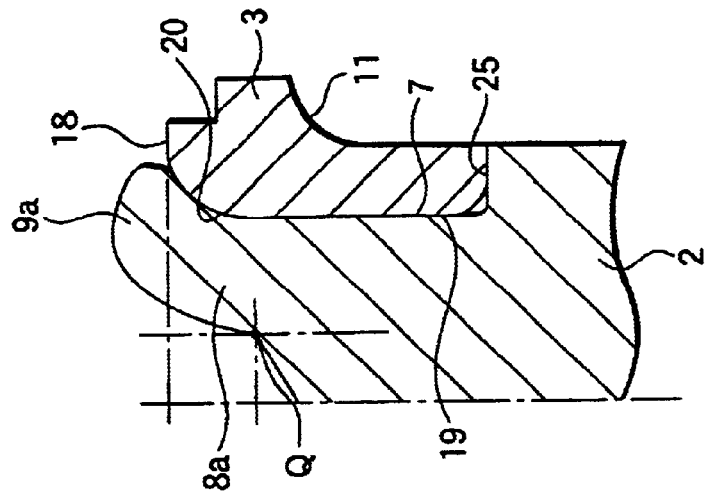
FIGS. 3A to 3C are views showing a sectional shape of a calking portion obtained by the method of the present invention and also showing a sectional shape of a calking portion obtained by the conventional method.
Figure 3B:
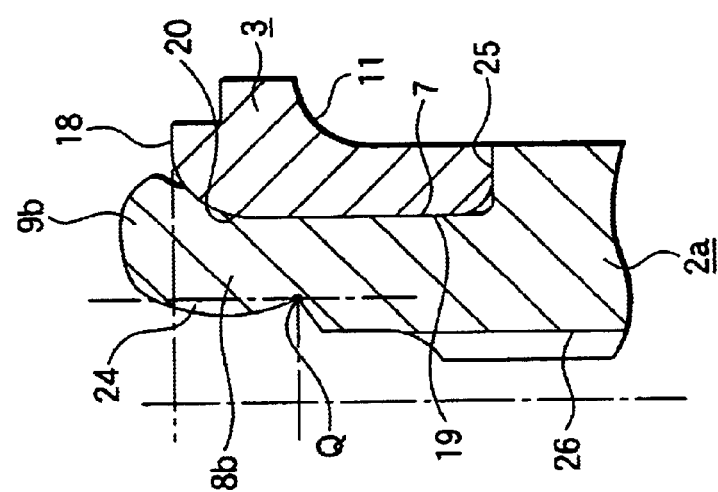
Figure 3A:
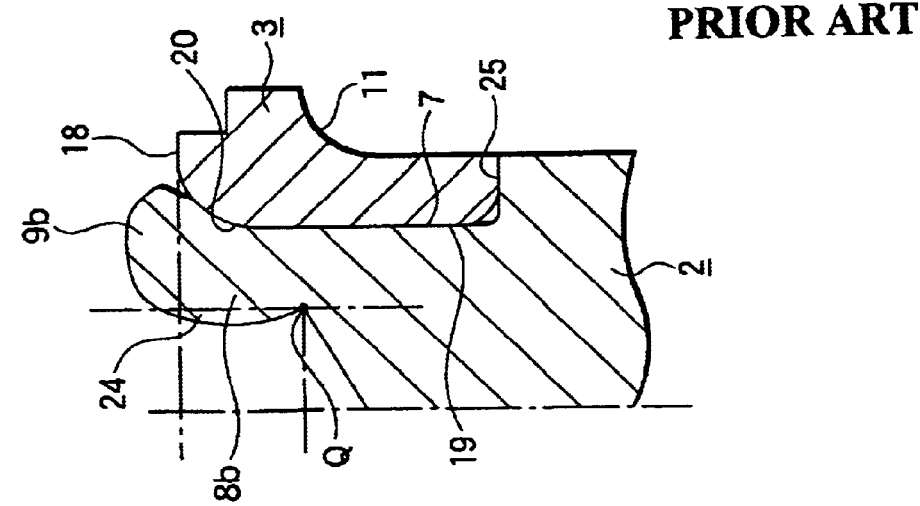

In FIGS. 3A and 3B, there is shown a more specific shape of the calking portion 9b which is formed in the inside end portion of the hub body 2, 2a by the method of the present invention. In this case, FIG. 3A shows a case in which the calking portion 9b is formed in the inside end portion of the solid hub body 2 used for a driven wheel having no central hole, and FIG. 3B shows a case in which the calking portion 9b is formed in the inside end portion of the hub body 2a used for a driving wheel having a spline hole 26 at the center. In the case where the calking portion is formed in the inside end portion of the hub body used for a driven wheel having a central hole, the structure is the same as that shown in FIG. 3B. On the other hand, FIG. 3C shows a case in which the calking portion 9a is formed by the conventional method in the inside end portion of the hub body 2 used for a driven wheel having no central hole. As can be seen when FIG. 3C is compared with FIGS. 3A and 3B, the calking portion 9b formed by the method of the present invention has an expanding portion 24 which is formed in the inner diameter portion of the calking portion 9b and expanded inward in the radial direction. This expanding portion 24 is formed when a portion of the metallic material forming the cylindrical portion 8b (shown in FIGS. 1A and 1B) is moved inward in the radial direction. In this case, it is clear that an average compressive stress is continuously given to the metallic material in the process of calking, and also it is clear that even if an average tensile stress is generated, an intensity of the average tensile stress is low. On the other hand, in the case of the calking portion 9a shown in FIG. 3C manufactured by the conventional method, the overall calking portion 9a is plastically deformed outward in the radial direction. Therefore, it is clear that the metallic material is continuously given a tensile average stress in the process of plastic deformation. Even when the indications of cracks are caused in the metallic material under the condition that the metallic material is given a compressive stress, a force to restore the metallic material to its former condition is given to it. On the other hand, when the metallic material is given a tensile average stress, a force to increase the cracks is given to the metallic material. Due to the foregoing, it can be understood that the calking portion 9b is difficult to be damaged and the yield can be enhanced when the present invention is adopted.

When the present invention is executed, it is preferable that the pressing face portion on the surface of the die 15a, which comes into contact with the cylindrical portion 8b and plastically deforms this cylindrical portion 8b, that is, the inner face of the annular recess portion 23 of the die 15a is subjected to one of or both of the treatment such as ceramic coating of TiN for enhancing the abrasion resistance property and the treatment such as shot-peening for reducing the surface roughness. In this way, the abrasion resistance property of the inner face of the annular recess portion 23 is enhanced and the friction coefficient of the inner face of the annular recess portion 23 is stabilized at a relatively high value not less than 0.3.

When the cylindrical portion 8b is machined into the calking portion 9b with an oscillating calking device, the cylindrical portion 8b or the calking portion 9b is strongly rubbed on the inner face of the annular recess portion 23. When the abrasion resistance property on the inner face of the annular recess portion 23 is enhanced, it is possible to suppress the occurrence of abrasion irrespective of the strong rubbing motion. Therefore, the durability of the die 15a can be enhanced. When the friction coefficient is stabilized at a high value, it is possible to continuously generate a compressive average stress in the cylindrical portion 8b or the calking portion 9b, and cracks are seldom caused in the thus obtained calking portion 9b.

When the cylindrical portion 8b is plastically deformed into the calking portion 9b, if a tensile average stress is given to the middle portion or the portion close to the forward end portion of the cylindrical portion 8b or the calking portion 9b, cracks tend to be caused in the portion concerned. However, when the cylindrical portion 8b, the shape of which is described before, is plastically deformed by the die 15a, a compressive average stress is given to the above portion, so that the occurrence of damage such as cracks can be suppressed. When the friction coefficient on the inner face of the annular recess portion 23 is increased, the compressive average stress can be more positively acted in the above portion. Therefore, the occurrence of damage such as cracks can be more positively suppressed.

In the case where the annular recess portion 23 formed in the die 15a made of steel is not particularly subjected to surface treatment, the friction coefficient of the annular recess portion 23 is approximately 0.05 to 0.2, however, in the case where the annular recess portion 23 is subjected to surface treatment of ceramic coating of TiN, the friction coefficient of the annular recess portion 23 is stabilized at a high value of 0.3 to 0.5. When the die 15a subjected to ceramic coating is used and the cylindrical portion 8b is plastically deformed without using lubricant in the portion to be machined, the occurrence of damage such as cracks can be avoided, and the calking portion 9b of high quality can be manufactured by a high yield. In this connection, when shot-peening is conducted on a surface of the annular recess portion 23 before or after conducting ceramic coating, the friction coefficient of the annular recess portion 23 can be increased, and it becomes possible to obtain a more excellent calking portion 9b. In this connection, even in the case where only shot-peening is conducted without conducting ceramic coating, the abrasion resistance property can be enhanced and the friction coefficient can be increased as compared with a case in which no surface treatment is conducted on the annular recess portion 23.

Figure 4:
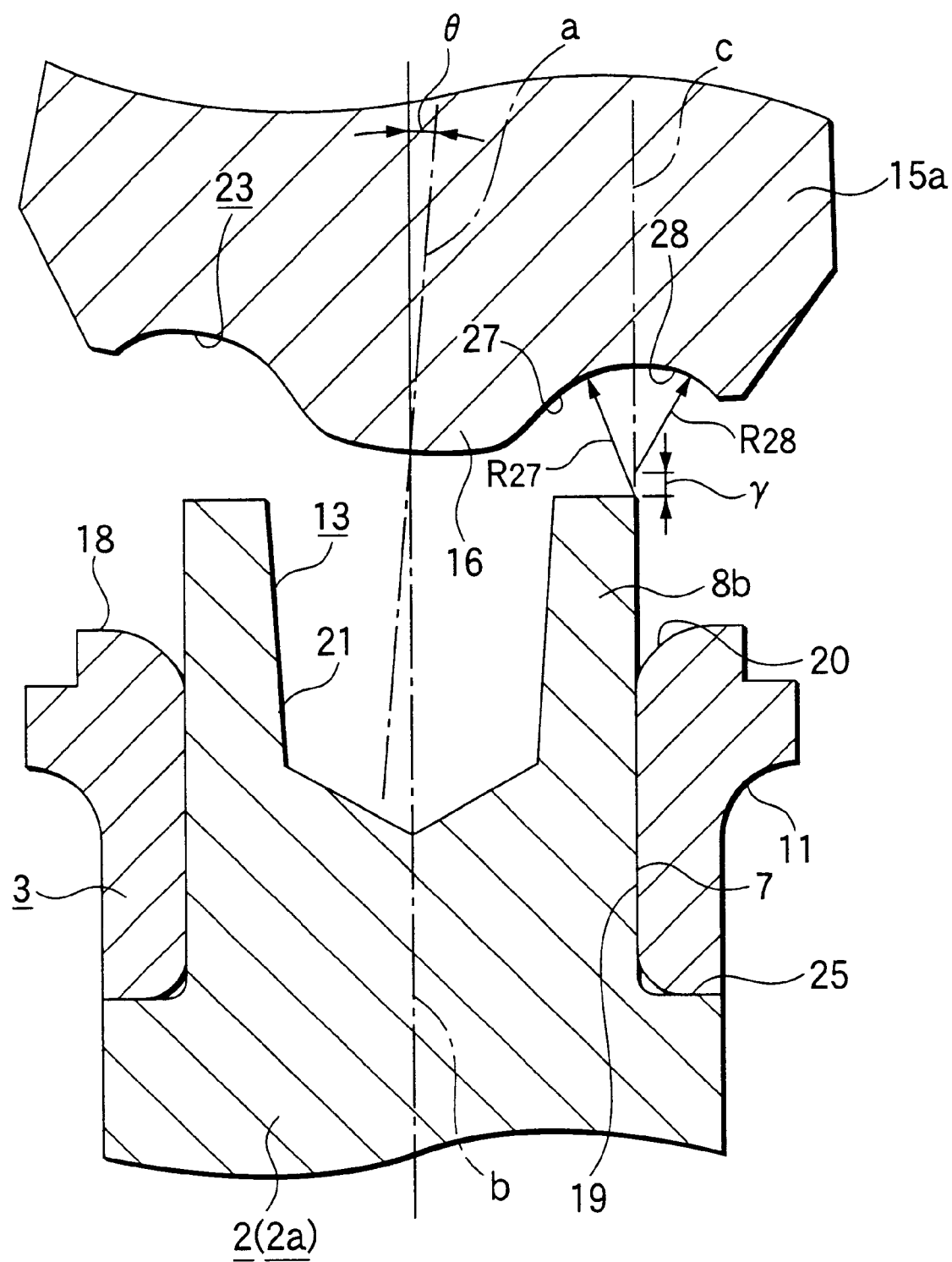
FIG. 4 is a sectional view showing an embodiment of a die for manufacturing a hub unit for supporting a wheel of the present invention, wherein this view shows a state in which the die is opposed to the hub body and not contacted with it yet.

Next, explanations will be made into a preferable shape of the die 15a which is used under the condition that the die 15a is incorporated into an oscillating calking device when the present invention is executed. In the process of working the cylindrical portion 8b into the calking portion 9b by plastically deforming a forward end portion of the cylindrical portion 8b, which is formed in an inside end portion of the hub 2, 2a, into the calking portion 9b, in order to continuously generate a compressive average stress on the inner circumferential face of the cylindrical portion 8b, or in order to suppress a value of the tensile average stress even if the tensile average stress is generated, a shape of the cylindrical portion 8b must be devised and further a shape of the die 15a colliding with the forward end face of the cylindrical portion 8b must be devised. Concerning the die used for the above object, the die 15a shown in FIG. 4 is used. The die 15a includes: a protruding portion 16, the shape of which is a circular truncated cone capable of being freely pushed into the cylindrical portion 8b, being arranged at the center of the forward end face; and an annular recess portion 23 arranged in the periphery of the protruding portion 16 in such a manner that the annular recess portion 23 surrounds the entire circumference of the protruding portion 16 concentrically with the protruding portion 16. In the case of the above die 15a, a sectional shape of the annular recess portion 23 is especially important. Like the structure described before in Japanese Unexamined Patent Publication No. 10-272903, it can be considered to use a complex curved surface on which various types of arcs are continued. However, the working of the above complex curved surface is complicated, which raises the manufacturing cost of the die 15a. Therefore, in the following example, explanations will be made into a case in which a sectional shape of a portion of the cylindrical portion 8b to be machined is composed of only two types of arcs, the radiuses of curvature of which are different from each other. Alternatively, explanations will be made into a case in which a sectional shape of a portion of the cylindrical portion 8b to be machined is composed of two types of arcs, the radiuses of curvature of which are different from each other, and a straight line.

First, as shown in FIG. 4, it can be considered that a basic sectional shape of the annular recess portion 23, which is preferable to execute the present invention, is a shape in which an outer circumferential edge of the inner diameter side arc portion 27 and an inner circumferential edge of the outer diameter side arc portion 28 are smoothly continued to each other. In these arc portions 27, 28, the radius of curvature $R_{27}$ of the inner diameter side arc portion 27 existing in a portion close to the inner diameter is larger than the radius of curvature $R_{28}$ of the outer diameter side arc portion 28 existing in a portion close to the outer diameter. In this case, in the case of a hub unit for supporting a wheel of a common passenger car, $R_{27}$ is approximately 3 to 13 mm, and $R_{28}$ is approximately 3 to 7 mm. In this example, as shown in FIG. 4, the centers of the radiuses of curvatures $R_{27}$ and $R_{28}$ are located on a single virtual straight line which is parallel with the central axis of the cylindrical portion 8b when the annular recess portion 23 butts to a forward end face of the cylindrical portion 8b.

Figure 5:
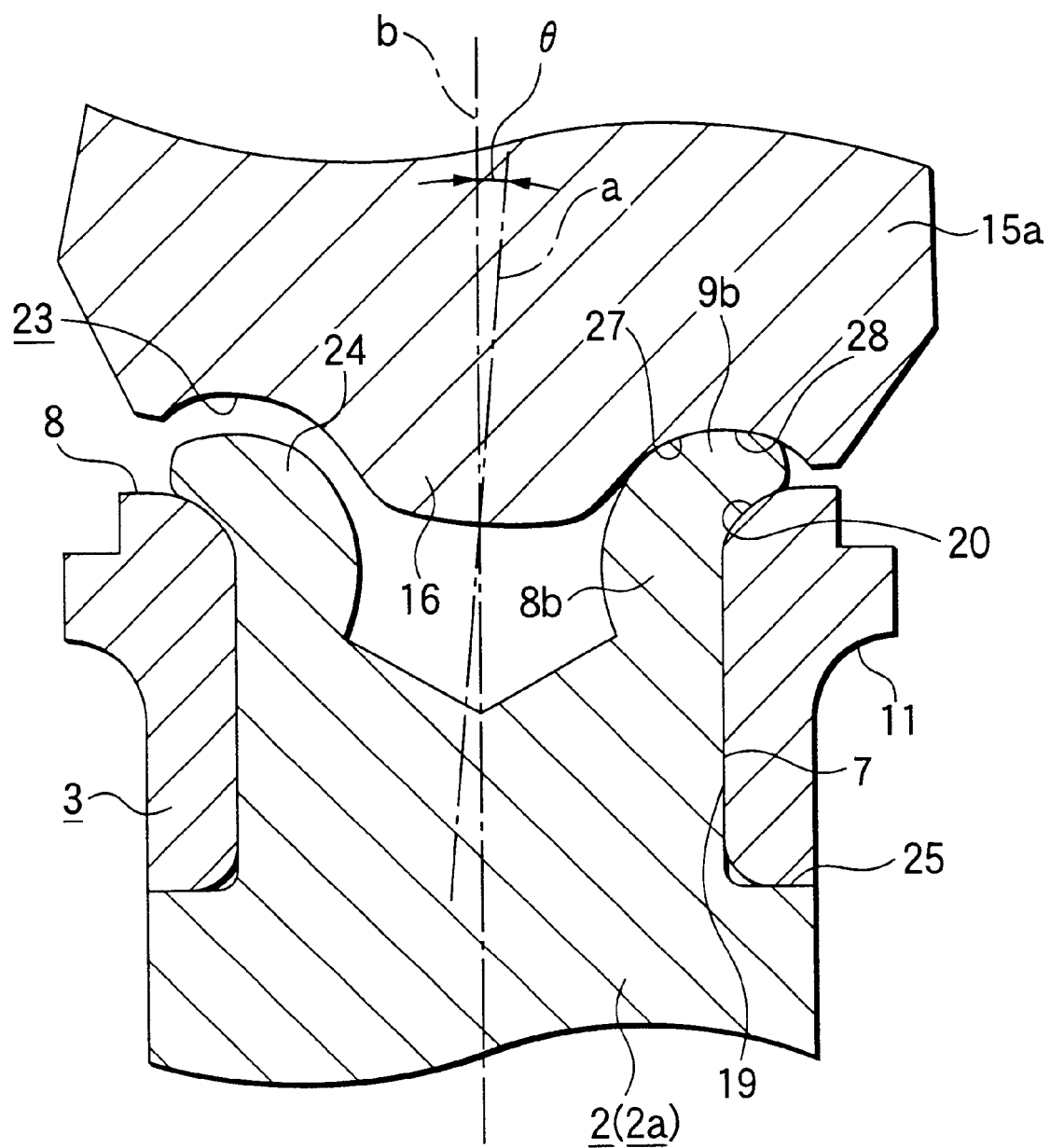
FIG. 5 is a sectional view showing a state in which the working of a calking portion has been substantially completed.

Under the condition that the die 15a is incorporated into an oscillating device, the central axis "a" of the die 15a, which is pressed against the forward end portion of the cylindrical portion 8b, is inclined with respect to the central axis "b" of the cylindrical portion 8b by the small angle θ (for example, by the angle not more than 20). Accordingly, as shown in FIG. 5, only one portion of the annular recess portion 23 in the circumferential direction is pressed against the forward end portion of the cylindrical portion 8b. The thus pressed portion is changed in the circumferential direction according to an oscillating displacement of the die 15a. As a result, the cylindrical portion 8b is continuously plastically deformed in the circumferential direction little by little. For the above reasons, concerning the annular recess portion 23, a sectional shape of the portion (a portion on the right in FIGS. 4 and 5) pressed against the forward end portion of the cylindrical portion 8b becomes important. Therefore, the sectional shape of the annular recess 23 is discussed in a state in which the annular recess portion 23 butts to the forward end face of the cylindrical portion as shown in FIGS. 4 and 5. Accordingly, this description about the sectional shape of the annular recess portion 23 holds good in the right portion of FIGS. 4 and 5 in which the die 15a butts to the forward end face of the cylindrical face 8b when the die 15a approaches the hub body 2, 2a, that is, this description about the sectional shape of the annular recess portion 23 does not hold good in the left portion of FIGS. 4 and 5 in which the die 15a does not butt to the forward end face of the cylindrical face 8b.

In the structure shown in FIG. 4, as described before, the center of the radius of curvature $R_{27}$ of the inner diameter side arc portion 27 existing in a portion close to the inner diameter and the center of the radius of curvature $R_{28}$ of the outer diameter side arc portion 28 existing in a portion close to the outer diameter are located on a single virtual straight line which is parallel with the central axis "b" of the cylindrical portion 8b, and a quantity γ of deviation of both centers with respect to the axial direction of the virtual straight line is made to agree with a difference ($R_{27}-R_{28}=γ$) between both the radiuses of curvatures. Accordingly, an outer circumferential edge of the inner diameter side arc portion 27 and an outer circumferential edge of the outer diameter side arc portion 28 are smoothly continued to each other when they are extended in the tangent direction. The above virtual straight line, on which the radiuses of curvatures $R_{27}$ and $R_{28}$ are existing, does not exist outside the outer circumferential face of the cylindrical portion 8b with respect to the radial direction of the cylindrical portion 8b and the die 15a, in a state in which the annular recess portion 23 butts to the forward end face of the cylindrical portion 8b.

The above virtual straight line agrees with the chain line "c" which is an extension of the generating line of the outer circumferential face of the cylindrical portion 8b. Alternatively, the above virtual straight line exists on the inner diameter side (close to the central axis "b" of the cylindrical portion 8b) of the chain line "c". However, even when the virtual straight line is arranged on the inner diameter side, a distance (displacement) between the virtual straight line and the chain line "c" is kept at about 1.0 mm. It is preferable that a distance (displacement) between the virtual straight line and the chain line "c" is kept at about 0.5 mm. When the positions of the radiuses of curvatures $R_{27}$ and $R_{28}$ are regulated in this way, a force of holding the inner ring 3b by the calking portion 9b can be ensured and further the occurrence of damage of the die 15a can be prevented. Referring to FIGS. 6 and 7, the results of experiments made by the inventors to investigate this point will be explained below.

FIG. 6 is a graph showing a relation between the displacement and the force of the calking portion 9b to hold the inner ring 3b. The axis of ordinate of the graph shown in FIG. 6 represents a ratio ($F_2/F_1$) of $F_2$ to $F_1$, wherein $F_1$ is a force given by the die 15a to the inner ring 3b outward in the axial direction, and $F_2$ is a force given by the calking portion 9b to the inner ring 3b outward in the axial direction after the pressing force given by the die 15a has been removed. In this case, $F_1$ is a force given by the die 15a to the inner ring 3b via the calking portion 9b at the final stage of working the calking portion 9b. When this ratio is high, it becomes possible to form a calking portion 9b, the holding force of which is strong so that the inner ring 3b can be strongly held, by suppressing an intensity of the force given to the die 15a. Accordingly, a load given to the inner ring 3b in the process of calking can be reduced. Therefore, it is preferable that the ratio is high. Numerals described on the axis of abscissa in the graph shown in FIG. 6 express the above displacements. In this connection, the mark "+" of the displacement expresses that the above virtual straight line is located on the outer diameter side of the chain line "c" of the extension of the generating line on the outer circumferential face of the cylindrical portion 8b. The mark "−" of the displacement expresses that the above virtual straight line is located on the inner diameter side of the chain line "c" of the extension of the generating line on the outer circumferential face of the cylindrical portion 8b. The mark "Displacement= 0" expresses that the virtual straight line is located on the chain line "c". According to the experiments made by the present inventors, when the above displacement was in the range from −1 to +1.1 mm, the requirements to the calking portion 9b were satisfied. However, when the above displacement was +0.64 mm and when the above displacement was +1.1 mm, the above ratio was lower than that of other cases. When the above displacement was −1 mm, lack of wall thickness was caused in one portion of the obtained calking portion. On the other hand, when the displacement was 0 mm and −0.5 mm, the ratio was high and the appearance of the obtained calking portion 9b was excellent.

Next, FIG. 7 is a graph expressing a relation between the above displacement and an intensity of the force given to the die 15a in the process of calking. The meaning of the axis of abscissa of the graph shown in FIG. 7 is the same as that of the graph shown in FIG. 6. When the intensity of the force given to the die 15a in the process of calking expressed on the axis of ordinate is low, the occurrence of damage such as cracks in the die 15a is reduced, and it becomes possible to ensure the durability of the die 15a and reduce the manufacturing cost. When the intensity of the above force is increased, a portion of the die 15a close to the outer circumference surrounding the annular recess portion 23 is given a high intensity of the force. Therefore, cracks tend to be caused on the bottom face side of the annular recess portion 23. When the above cracks are caused, it becomes necessary to replace the above die 15a, which raises the manufacturing cost. Therefore, it is preferable that the intensity of the above force is low. According to the experiments made by the inventors, when the displacement was 0 mm, the intensity of the above force was the lowest, and when the displacement was −0.5 mm, the intensity of the above force was the second lowest. It was confirmed that when the displacement was +0.64 mm and +1.1 mm, the intensity of the above force was increased and it was difficult to ensure the durability of the die 15a. In this connection, when the displacement was −1 mm, lack of the wall thickness of the calking portion 9b was caused as described before. Therefore, this case was not described in FIG. 7. According to the results shown in FIG. 7, it can be understood that the displacement 0 mm and the displacement −0.5 mm are preferable. Of course, the displacement between 0 mm and −0.5 mm is also preferable.

Figure 8A:
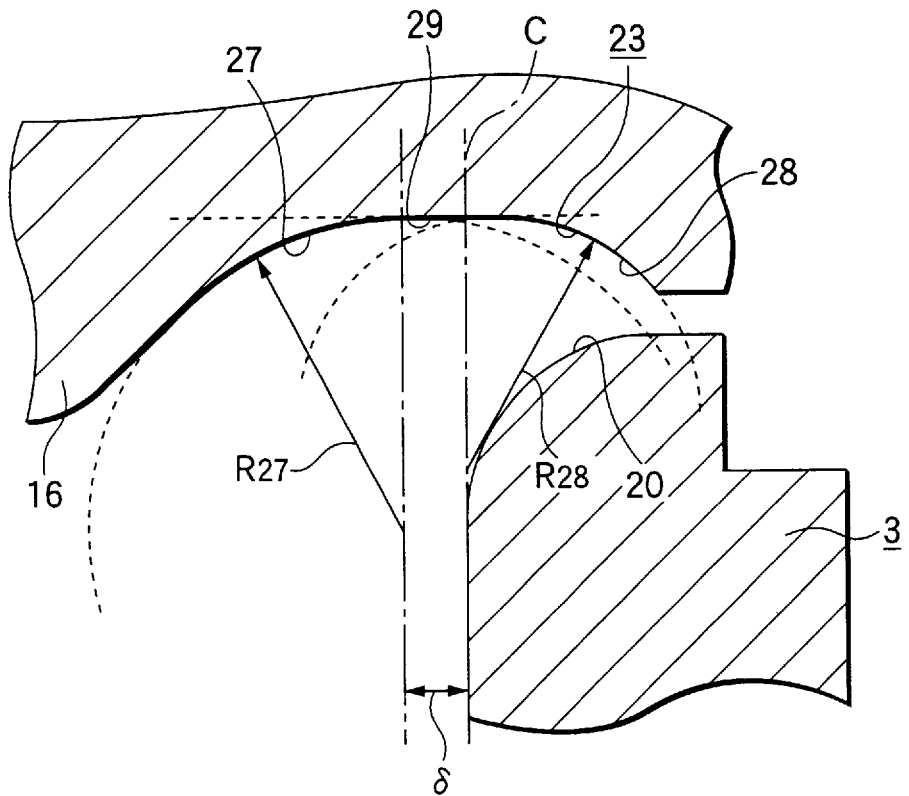
FIGS. 8A and 8B are partial enlarged sectional views showing another embodiment of a sectional shape of a recess of a die.
Figure 8B:
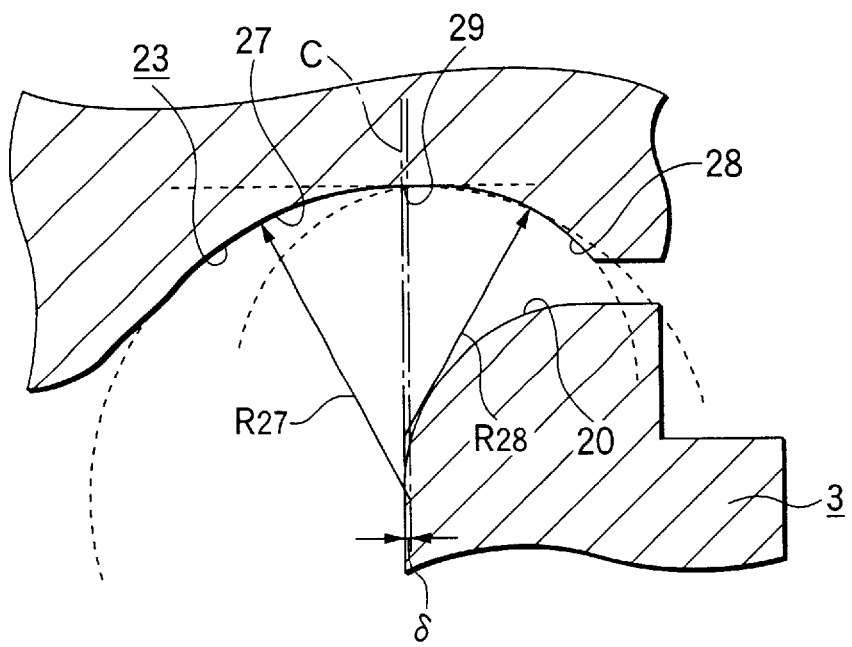

Next, referring to FIGS. 8A and 8B, explanations will be made into a sectional shape of the annular recess portion 23 of the die 15a in which the outer circumferential edge of the inner diameter side arc portion 27 and the inner circumferential edge of the outer diameter side arc portion 28 are continued to each other via the straight line portion 29. In the case of providing the above straight line portion 29, when the center of the radius of curvature $R_{27}$ of the inner diameter side arc portion 27 is a little shifted from the center of the radius of curvature $R_{28}$ of the outer diameter side arc portion 28 to the inner diameter side with respect to the radial direction of the hub body 2, 2a, it is possible to suppress the maximum hydrostatic pressure given to the calking portion 9b when the calking portion 9b is formed. Concerning this point, the results of the experiments made by the present inventors will be explained referring to FIG. 9. In this connection, the experiments was made as follows. The center of the radius of curvature $R_{28}$ of the outer diameter side arc portion 28 was located on the production (chain line "c") of the generating line (=the generating line of the inner circumferential face of the inner ring 3) of the outer circumferential face of the cylindrical portion 8b of the hub body 2a, and the distance δ (displacement) between this production and the center of the radius of curvature $R_{27}$ of the inner diameter side arc portion 27 with respect to the radial direction of the cylindrical portion 8b was changed. Then, it was investigated how the displacement δ had affected the maximum hydrostatic pressure.

Figure 9:
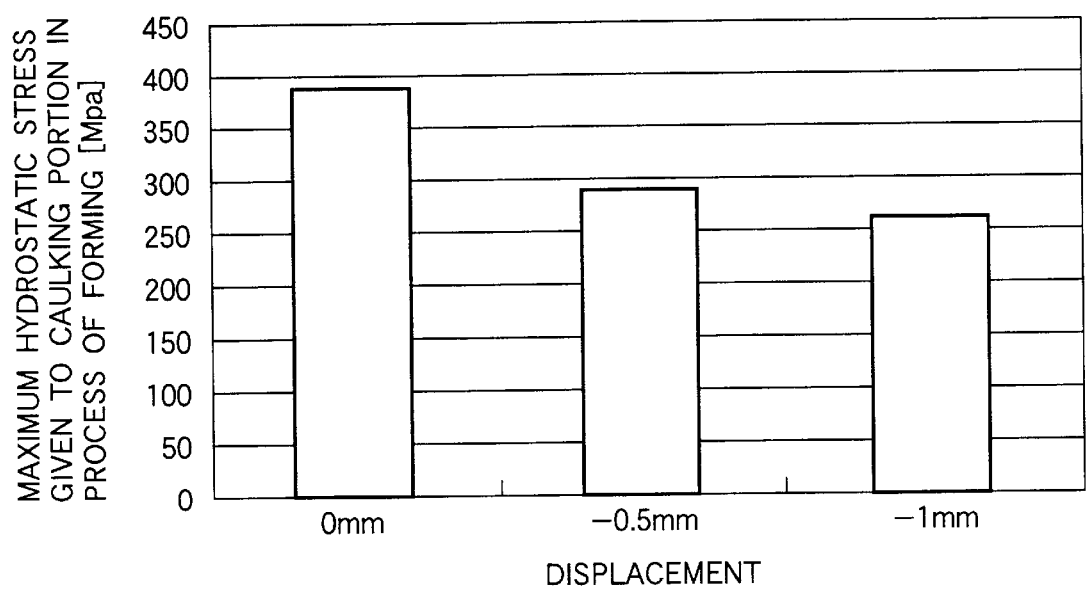
FIG. 9 is a graph showing the result of an experiment made to investigate how a sectional shape of a recess portion of a die affects the maximum value of hydrostatic stress given to a calking portion in the process of working the calking portion.

In FIG. 9 showing the results of the experiments which were made under the above condition, the case in which the displacement expressed on the axis of abscissa is 0 mm is the same as the case in which the displacement is 0 mm shown in FIGS. 4 to 7. The displacement −0.5 mm shows a case in which the center of the radius of curvature $R_{27}$ of the inner diameter side arc portion 27 is located at a position shifted inside by 0.5 mm from the production (chain line "c") of the generating line of the outer circumferential face of the cylindrical portion 8b of the hub body 2a as shown in FIG. 8A. The displacement −1 mm shows a case in which the center of the radius of curvature $R_{27}$ of the inner diameter side arc portion 27 is located at a position shifted inside by 1 mm from the production (chain line "c") of the generating line of the outer circumferential face of the cylindrical portion 8b of the hub body 2a as shown in FIG. 8A. In this connection, FIG. 8B shows an unpreferable shape in which the displacement is "+", that is, the center of the radius of curvature $R_{27}$ of the inner diameter side arc portion 27 is located at a position outside the production (chain line "c") of the generating line.

As can be seen in the experiments made under the above conditions, when the center of the radius of curvature $R_{27}$ of the inner diameter side arc portion 27 is located at a position inside the center of the radius of curvature $R_{28}$ of the outer diameter side arc portion 28, it is possible to suppress the maximum hydrostatic pressure given to the calking portion 9b in the process of forming the calking portion 9b. Accordingly, in the case where the ductility of metallic material composing the hub body 2, 2a is low, it can be considered that the aforementioned straight line portion 29 is set so as to suppress the maximum hydrostatic pressure given to the calking portion 9b in the process of forming the calking portion 9b. However, when the length of the straight line section 29, that is, the displacement δ exceeds 1 mm, lack of the wall thickness is caused in the calking portion 9b to be obtained. Therefore, it is preferable that the displacement is suppressed at a value not more than 1 mm.

The method of manufacturing a hub unit for supporting a wheel and the die for manufacturing it of the present invention act as described above. Therefore, the inner ring can be positively fixed to the hub body, and further it becomes possible to realize a hub unit for supporting a wheel in which the rolling fatigue life of the inner ring raceway formed on the outer circumferential face of the inner ring can be sufficiently ensured.

What is claimed is:

1. A method of manufacturing a hub unit for supporting a wheel, the hub unit including: a hub body having one end face on which a flange for supporting a wheel is formed; a first inner ring raceway formed on an outer circumferential face of an intermediate portion of the hub body directly or via a first inner ring provided differently from the hub body; a step portion formed in the other end portion of the hub body, and having an outer diameter being smaller than an outer diameter of a portion in which the first inner ring raceway is formed; a second inner ring externally engaged with the step portion, a second inner ring raceway being formed on an outer circumferential face of the second inner ring; an outer ring having an inner circumferential face on which a first outer ring raceway opposing to the first inner ring raceway and a second outer ring raceway opposing to the second inner ring raceway are formed; a plurality of rolling elements provided between the first inner ring raceway and the first outer ring raceway and between the second inner ring raceway and the second outer ring raceway; and a calking portion fixing the second inner ring to the hub body while pressing the second inner ring against a step face of the step portion, the method of manufacturing the hub unit comprising the steps of:

preparing a cylindrical portion formed in the other end portion of the hub body, the cylindrical portion being formed to protrude from the second inner ring externally engaged with the step portion; and applying a force in the axial direction and a force in the radial outward direction to the cylindrical portion by a die, while pressing the die against a forward end face of the cylindrical portion, so as to plastically deform a forward end portion of the cylindrical portion outwardly in the radial direction while compressing the cylindrical portion in the axial direction, to thereby form the calking portion, wherein an average compressive stress is continuously generated in an inner circumferential portion of the cylindrical portion during the period of working the calking portion.

2. The method according to claim 1, wherein the die is pressed against the cylindrical portion in a state that a center axis of the die is inclined with respect to a center axis of the cylindrical portion.

3. The method according to claim 1, wherein a thickness of the forward end portion of the cylindrical portion is set to 70 to 100% of a thickness of a base end portion of the cylindrical portion.

4. A method of manufacturing a hub unit for supporting a wheel, the hub unit including: a hub body having one end face on which a flange for supporting a wheel is formed; a first inner ring raceway formed on an outer circumferential face of an intermediate portion of the hub body directly or via a first inner ring provided differently from the hub body; a step portion formed in the other end portion of the hub body, and having an outer diameter being smaller than an outer diameter of a portion in which the first inner ring raceway is formed; a second inner ring externally engaged with the step portion, a second inner ring raceway being formed on an outer circumferential face of the second inner ring; an outer ring having an inner circumferential face on which a first outer ring raceway opposing to the first inner ring raceway and a second outer ring raceway opposing to the second inner ring raceway are formed; a plurality of rolling elements provided between the first inner ring raceway and the first outer ring raceway and between the second inner ring raceway and the second outer ring raceway; and a calking portion fixing the second inner ring to the hub body while pressing the second inner ring against a step face of the step portion, the method of manufacturing the hub unit comprising the steps of:

preparing a cylindrical portion formed in the other end portion of the hub body, the cylindrical portion being formed to protrude from the second inner ring externally engaged with the step portion; and applying a force in the axial direction and a force in the radial outward direction to the cylindrical portion by a die, while pressing the die against a forward end face of the cylindrical portion, so as to plastically deform a forward end portion of the cylindrical portion outwardly in the radial direction while compressing the cylindrical portion in the axial direction, to thereby form the calking portion, wherein in the applying step, a portion of the metallic material forming the cylindrical portion is moved in the radial inward direction so that an expanding portion expanding in the radial inward direction is formed in the inner diameter portion of the calking portion after the completion of forming the calking portion.

5. The method according to claim 4, wherein the die is pressed against the cylindrical portion in a state that a center axis of the die is inclined with respect to a center axis of the cylindrical portion.

6. The method according to claim 4, wherein a thickness of the forward end portion of the cylindrical portion is set to 70 to 100% of a thickness of a base end portion of the cylindrical portion.

7. A die for manufacturing a hub unit for supporting a wheel according to the method of claim 4, the die applying a force in the axial direction and a force in the radial outward direction to a cylindrical portion of the hub body by pressing the die against a forward end face of the cylindrical portion, the die comprising:

a protruding portion, the shape of which is a circular truncated cone, formed at the center of a forward end face, the protruding portion being adapted to be pushed into the cylindrical portion; and an annular recess portion formed in the periphery of the protruding portion to surround an overall circumference of the protruding portion, wherein a shape of a section of the annular recess portion includes an inner diameter side arc portion existing in a portion close to the inner diameter and an outer diameter side arc portion existing in a portion close to the outer diameter, the radius of curvature of the outer diameter side arc portion is smaller than that of the inner diameter side arc portion, the inner diameter side arc portion and the outer diameter side arc portion are smoothly continued to each other, and wherein when the annular recess portion is pressed against the forward end face of the cylindrical portion, a center of the radius of curvature of the inner diameter side arc portion does not exist outside a center of the radius of curvature of the outer diameter side arc portion with respect to the radial direction of the cylindrical portion, and the center of the radius of curvature of the outer diameter side arc portion does not exist outside the outer circumferential face of the cylindrical portion with respect to the radial direction of the cylindrical portion.

8. The die according to claim 7, wherein the inner diameter side arc portion and the outer diameter side arc portion are smoothly continued to each other directly.

9. The die according to claim 7, wherein the inner diameter side arc portion and the outer diameter side arc portion are smoothly continued to each other via a straight line portion formed therebetween.

10. The die according to claim 7, wherein the annular recess portion is subjected to ceramic coating.

11. The die according to claim 7, wherein the annular recess portion is subjected to shot-peening treatment.

* * * * *